United States Patent
Flanagan et al.

(10) Patent No.: US 7,120,902 B2
(45) Date of Patent: Oct. 10, 2006

(54) METHOD AND APPARATUS FOR AUTOMATICALLY INFERRING ANNOTATIONS

(75) Inventors: Cormac Andrias Flanagan, San Francisco, CA (US); K. Rustan M. Leino, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 737 days.

(21) Appl. No.: 10/005,923

(22) Filed: Dec. 4, 2001

(65) Prior Publication Data

US 2002/0133806 A1     Sep. 19, 2002

Related U.S. Application Data

(60) Provisional application No. 60/251,304, filed on Dec. 4, 2000, provisional application No. 60/251,305, filed on Dec. 4, 2000.

(51) Int. Cl.
*G06F 9/44* (2006.01)

(52) U.S. Cl. ........................ 717/130; 717/158
(58) Field of Classification Search ........ 717/124–133, 717/139–147, 158
See application file for complete search history.

(56) References Cited

U.S. PATENT DOCUMENTS

| | | | | |
|---|---|---|---|---|
| 5,423,027 A * | 6/1995 | Jackson | ....................... | 714/38 |
| 5,963,739 A * | 10/1999 | Homeier | ..................... | 717/126 |
| 5,987,252 A | 11/1999 | Leino et al. | ................. | 392/704 |
| 6,128,774 A * | 10/2000 | Necula et al. | .............. | 717/146 |
| 6,154,876 A * | 11/2000 | Haley et al. | ................. | 717/133 |
| 6,343,376 B1 * | 1/2002 | Saxe et al. | .................. | 717/154 |
| 6,553,362 B1 * | 4/2003 | Saxe et al. | ..................... | 706/47 |
| 2002/0083418 A1 * | 6/2002 | Saxe et al. | .................. | 717/126 |

OTHER PUBLICATIONS

Detlefs, David, "An overview of the extended static checking system," *Proceedings of The First Workshop on Formal Methods in Software Practice*, pp. 1-9 (Jan. 1996).
Flanagan et al., "Annotation inference for Modular Checkers," *Information Processing Letters*, 77: 97-108 (Feb. 2001)
Flanagan, Cormac and Leino, K. R. M., "Houdini, an Annotation Assistant for ESC/Java," *SRC Technical Note 2000-003* (Dec. 31, 2000).
Intrinsa Corp., "A Technical Introduction to PREfix/Enterprise" (1998).
Leino et al., "Checking Java Programs via Guarded Commands," *SRC Technical Note 1999-002*, Compaq Computer Corporation (May 21, 1999).
Leino et al., "ESC/Java User's Manual," *Technical Note 2000-002*, Compaq Systems Research Center (Oct. 2000).
Levine et al., "lex & yacc" (2nd ed.) (O'Reilly Publ. 1992).
Leino, K. R. M. and Nelson, G., "An extended static checker for Modula-3," In *Compiler Construction*: $7^{th}$ *International Conference, CC'98* (Kai Koskimies, ed.), vol. 1383 of Lecture Notes in Computer Science, pp. 302-305 (Apr. 1998) (Springer-Verlag 1998).

(Continued)

*Primary Examiner*—Tuan Dam
*Assistant Examiner*—John Romano

(57) ABSTRACT

A system, method and computer program product for annotating a computer program. The method includes applying a program checking tool to the computer program to produce one or more warnings, mapping one of the warnings into an annotation modification, and modifying the computer program in accordance with the annotation modification. These steps are repeated until the program checking tool produces no warnings that are suitable for mapping into an annotation modification. The resulting modified computer program is then provided to a user for use or further development.

51 Claims, 4 Drawing Sheets

OTHER PUBLICATIONS

Millstein, "Toward More Informative ESC/Java Warning Messages," at http://gatekeeper.research.compaq.com/pub/DEC/SRC/technical-notes/SRC-1999-003-html/millstein.html (1999) (last accessed Nov. 21, 2001).

Savage et al., "Eraser: A Dynamic Data Race Detector for Multi-Threaded Programs," *ACM Transactions on Computer Systems*, vol. 15, No. 4, pp. 391-411 (Nov. 1997).

* cited by examiner

METHOD AND APPARATUS FOR AUTOMATICALLY INFERRING ANNOTATIONS

This application claims priority to provisional patent application entitled "Method and Apparatus for Automatically Inferring Annotations For an Extended Static Checker," Ser. No. 60/251,304, filed Dec. 4, 2000, and to provisional patent application entitled "Method and Apparatus for Automatically Inferring Annotations," Ser. No. 60/251,305, filed Dec. 4, 2000, both of which are incorporated herein by reference.

RELATED APPLICATIONS

This application is related to concurrently filed U.S. patent application, Ser. No. 10/007,113, entitled "Method and Apparatus for Automatically Inferring Annotations for an Extended Static Checker," incorporated herein by reference.

FIELD OF THE INVENTION

The present invention relates generally to program checking tools that automatically verify, using static checking techniques, the correctness of a computer program with respect to predefined criteria, and particularly to an inference system that automatically annotates the computer program by iterative application of the program checking tool so as to eliminate or reduce spurious warning messages produced by the program checking tool.

BACKGROUND OF THE INVENTION

The purpose of a program checking tool is to analyze a given computer program to determine whether or not it has certain desirable properties. Program checking tools, often called program checkers, are specific examples of verification systems that can also be used to analyze hardware components, formulae, algorithms, or, more generally, behavioral designs.

A good program checking tool has the property that the warnings it produces are informative and easy for a designer to understand. An informative warning message should, ideally, include a characterization of each possible defect (e.g., "array index out of bounds", "timing constraint not satisfied", "race condition", "deadlock", "failure to establish invariant") and a source location in the computer program where the verification system tried, but failed, to show the absence of the defect (e.g., "line 218 of file 'ABC.source'"). If a warning message is informative and easy to understand, the designer can more easily determine whether a warning is real or spurious, and what its cause is. The designer can then act accordingly, correcting the program at the source of the problem, or ignoring the warning, possibly annotating the program so that the warning will be suppressed next time the program checking tool is run. The cost of a programming error can be greatly reduced if it is detected early in the development process.

Dynamic, or run-time, checkers are a class of authoring tools that perform program checking functions and generate execution traces by executing or simulating the execution of the computer program in question. An example of such a tool is Eraser (S. Savage, M. Burrows, G. Nelson, P. Sobalvarro, and T. E. Anderson, "Eraser: A Dynamic Data Race Detector for Multithreaded Programming," *ACM Transactions on Computer Systems*, 15(4):391–411, (1997)).

In general, the use of run-time checkers entails a number of disadvantages: there may be an overhead to their use, i.e., the program to be checked may make intensive use of expensive resources or may use resources not available to the run-time checker; some errors in the program may only manifest themselves under certain run-time conditions, such as certain values of the initial parameters, and thus may not be discovered by the run-time checker; and some errors may be non-reproducible.

By contrast, static checkers catch errors at compile time without executing the program and are valuable because they can be applied throughout the development cycle. A common example of a static checker is a type checker, which detects errors such as the application of a function to inappropriate argument values. An example of a static checker is PREfix (available from Intrinsa Corp., (1998)), Testbed Studio, (available from BiZZdesign BV, P.O. Box 321, 7500 AH Enschede, of The Netherlands; see also www.BiZZdesign.com/products/products.html). Another static checker is the Compaq Extended Static Checker for Java ("ESC/Java"), which checks for additional errors that are not caught by traditional type systems, such as dereferencing a null pointer, indexing an array outside its bounds, or accessing a shared variable without holding its protecting lock. ESC/Java uses an underlying automatic theorem prover to precisely reason about whether or not these kinds of errors can occur.

Static checkers generally rely on the programmer to supply annotations. The computer program may be annotated by a developer to indicate aspects that may not be apparent to the checker, or to impose restraints on how the program operates, or to describe program properties such as invariants. The annotations may permit the program checking tool to find defects using a local (modular) analysis, because the annotations provide a specification of other parts of the program. In modular checking, the static program checker analyses one program module at a time, where a module may be a function, subroutine or some suitable compartment of the program. During such a modular analysis, the program checking tool verifies that the supplied annotations are consistent with the program. The presence of the annotations guides the checking process, thus making the checking problem conceptually and computationally simpler.

For example, conventional type checkers follow this modular approach and rely on type annotations to guide the type checking process. Similarly, static race detection checkers, like rccjava (Flanagan, C., and Freund, S. N., "Type-based race detection for Java," PLDI'00, *ACM SIGPLAN Notices*, 35(5):219–232, May 2000) rely on annotations describing the locking discipline. Additionally, extended static checkers like ESC/Modula-3 (Detlefs, D. L., Leino, K. R. M., Nelson, G., and Saxe, J. B., "Extended Static Checking," Research Report 159, Compaq Systems Research Center, December 1998) and ESC/Java (see www.research.compaq.com/SRC/esc/Esc.html) are modular checkers whose annotations include preconditions, postconditions, and object invariants.

The main costs in using a program checking tool, from the perspective of the programmer, comprise annotating the program, waiting for the tool to complete its analysis, and interpreting the tool's output. Often the dominant cost of using a program checking tool is annotating the program, especially for large legacy programs, because of the number of special constraints and conditions that need to be conveyed to the program checking tool via annotations.

Thus, a limitation of the modular checking approach is the burden on the programmer to supply annotations. Although programmers have grown accustomed to writing type annotations, they have been reluctant to provide additional annotations. This reluctance has been the major obstacle to the adoption of modular checkers like ESC/Java and rccjava. The burden of introducing annotations appears particularly pronounced when faced with the daunting task of applying such a checker to existing (unannotated) code bases. Preliminary experience with ESC/Java has indicated that a programmer can annotate an existing unannotated program at the rate of at most a few hundred lines per hour, though a lower rate is more usual if the programmer is unfamiliar with the code.

Some prior attempts at solving this problem have focused on modifying the program checking tool to eliminate the need for annotations altogether. An example of this approach is the abstract interpreter Syntox, for Pascal programs (Bourdoncle, F., "Abstract debugging of higher-order imperative languages." *Proceedings of the ACM SIGPLAN '93 Conference on Programming Language Design and Implementation, ACM SIGPLAN Notices*, (June 1993), 28(6):46–55). Such an approach has a number of disadvantages. It may reduce the number of program properties that the tool can check, thereby reducing the overall usefulness of the tool. It may increase the number of warnings produced by the tool thereby causing a concomitant increase in the effort of interpreting the tool's output. And, without an annotation language, a programmer has no way to formally write down properties to be used and checked by the program checking tool.

Other prior attempts at solving this problem try to minimize, but not eliminate, the number of annotations required. An example of this approach is an ML-style type inference algorithm (where ML—"meta-language"—is a functional programming language, see Milner, R., "A theory of type polymorphism in programming,"*Journal of Computer and System Sciences*, (1978), 17(3):348–375; Damas, L. and Miner, R., "Principal type-schemes for functional programs," *Conference Record of the Ninth Annual ACM Symposium on Principles of Programming Languages*, (POPL '82), 207–212, (January 1982)). This approach also has a number of disadvantages. For example, it may require a significant redesign of the program checking tool. The resulting tool may also be significantly more complicated, because it cannot rely on annotations to provide certain kinds of information.

Another prior attempt is a system for finding software defects called PREfix, cited hereinabove. It uses annotations, but these are not programmer-supplied. Instead, the annotations are inferred by PREfix and are stored in a database associated with the program being checked. This approach also has a number of disadvantages. Without a human-writeable annotation language, a programmer has no way to formally write down properties to be used and checked by the program checking tool. Without a human-readable annotation language, a programmer cannot inspect the annotations inferred by the tool. And, since PREfix both infers annotations and uses them, its design is different from, and is likely to be more complicated than, the design of a program checking tool that simply uses the annotations.

An approach not found in the prior art, and which is one of the foundations of the present invention, is to utilize the warnings produced by the program checking tool itself to infer annotations and to insert those annotations directly into the program. In this way, the program checking tool would function much as a black box in the sense that its internal workings are irrelevant for the purpose of the analysis. Such an approach could be repeated iteratively in such a way as to generate a modified computer program containing many new annotations at relatively little burden to the author but in such a way that the annotations would be intelligible.

A parser such as lex (see, for example, *lex & yacc,* 2nd Edition, by J. Levine, A. Mason & D. Brown, O'Reilly Publishing, (1992)) has not hitherto lent itself to such a scheme. Although parsers often suggest alterations to their input to correct lexical or syntactical errors and even act on these suggestions in the parser's internal representation of the input so the parser can continue to process the remainder of the input, such tools do not modify the program based on the suggestions and certainly do not iterate their analysis.

Similarly, LCLint is a tool that generates warnings about potential errors in programs (Evans, D., Guttag, J., Horning, J., and Tan, Y.-M., "LCLint: A tool for using specifications to check code," in, *ACM SIGSOFT Foundations in Software Engineering*, pp. 87–96, Software Engineering Notes, 19(5), December 1994), but although it may output suggestions for how to fix these potential errors, it does not insert annotations into the program.

Additionally, an ML-style type inference algorithm, as described above, infers type annotations for an underlying type checker but neither uses the type checker iteratively nor as a black box, and does not write the inferred annotations into the computer program.

Accordingly, the present invention is designed to reduce the cost in annotating programs by using the program checking tool as a black box, thereby leveraging off the functionality of the program checking tool, rather than having to duplicate it.

SUMMARY OF THE INVENTION

In summary, the present invention is a method and computer program product for annotating a computer program. The method includes applying a program checking tool to the computer program to produce one or more warnings, mapping one or more of the warnings into an annotation modification, and modifying the computer program in accordance with the annotation modification so that the number of annotations in the computer program changes. This procedure is repeated until the program checking tool produces no warnings that are suitable for mapping into an annotation modification. The resulting modified computer program is then provided to a user for use or further development.

In one embodiment of the method of the present invention, the mapping includes inspecting warnings of a first kind, and the modifying comprises inserting an annotation into the computer program. The inserted annotation is produced by mapping at least one of the warnings of the first kind into one or more annotation modifications. At least a subset of the warnings of the first kind are warnings about potential misapplications of primitive operations.

In another embodiment of the method of the present invention, a candidate set of heuristically derived annotations is inserted into the computer program prior to applying the program checking tool. In this embodiment, the mapping includes inspecting warnings of a second kind, the modifying involves removing one or more of the heuristically derived annotations from the computer program identified by the annotation modification, and the mapping and modifying are repeated until no new warnings of the second kind are produced. At least a subset of the warnings of the second kind are warnings about inconsistencies between the computer program and one or more of the annotations.

The system and computer program product of the present invention implement these methods of annotating a computer program.

Accordingly, the present invention further includes a computer program product for use in conjunction with a computer system, the computer program product comprising a computer readable storage medium and a computer program mechanism embedded therein. The computer program mechanism includes the following components. A program checking tool analyzes a computer program to produce one or more warnings. At least one warning mapper maps one of the warnings into at least one annotation modification. A program updater updates the computer program in accordance with the annotation modification so that the number of annotations in the computer program changes. Control instructions repeatedly invoke the program checking tool, warning mapper and program updater until no warnings produced by the program checking tool are suitable for mapping into an annotation modification.

The present invention also includes a system for annotating a computer program. The system includes at least one memory, at least one processor and at least one user interface, all of which are connected to one another by at least one bus. The at least one processor is configured to annotate the computer program with at least one annotation, apply a program checking tool for statically analyzing a computer program to produce one or more warnings, and map at least one of the warnings into at least one annotation modification. The processor is further configured to modify the computer program in accordance with the annotation modification so that the number of annotations in the computer program changes, and to repeat applying the program checking tool, mapping the warnings and modifying the program until no warnings produced by the program checking tool are suitable for mapping into an annotation modification.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
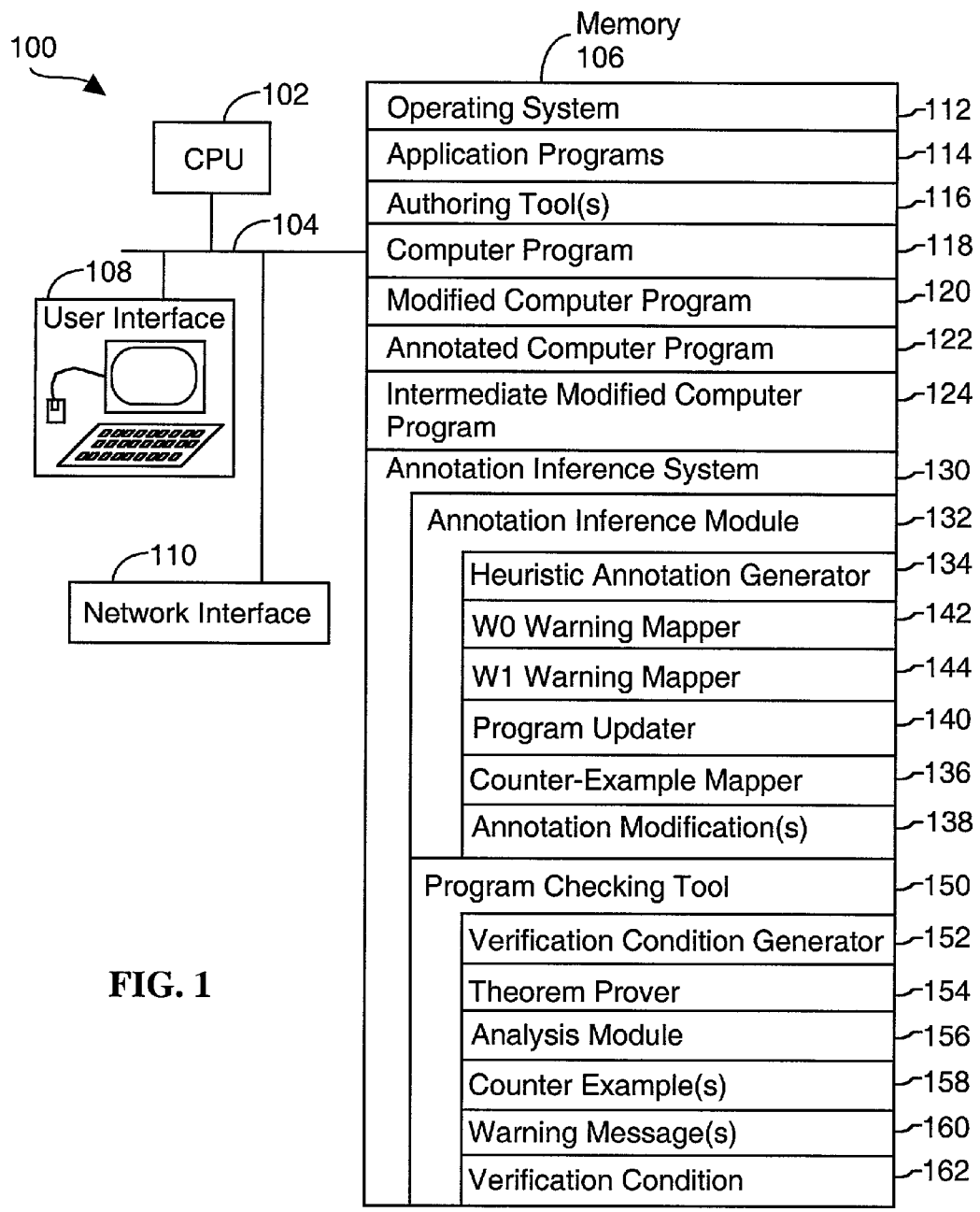
FIG. 1 is a block diagram of a programmed general purpose computer according to an embodiment of the annotation inference system of the present invention.

Referring to FIG. 1, the present invention may be implemented using a programmed general-purpose computer system 100. The computer system 100 includes: (a) one or more data processing units (CPU's) 102; (b) memory 106, which will typically include both high speed random access memory as well as non-volatile memory (such as one or more magnetic disk drives); (c) a user interface 108 which may comprise a keyboard, mouse and/or touch-screen display; (d) a network or other communication interface 110 for communicating with other computers as well as other devices; and (e) one or more communication busses 104 for interconnecting the CPU(s) 102, memory 106, user interface 108, and network interface 110.

The computer system's memory 106 stores procedures and data, typically including:

an operating system 112 for providing basic system services;

one or more application programs 114, such as user level programs for viewing and manipulating images;

one or more authoring tools 116, for assisting with the writing of computer programs;

a computer program 118 possibly containing some annotations, to be analyzed by an annotation inference system 130;

a modified computer program 120 that is the product of applying annotation inference system 130 to computer program 118; and a program checking tool 122 that, when applied to a computer program 118, produces zero or more warnings.

The annotation inference system 130 preferably includes:

an annotation inference module 132, also called an annotation assistant, which is the main procedure of the annotation inference system and controls its overall operation; and a program checking tool 150 that, when applied to a computer program 118, produces zero or more warnings.

Together, the elements of the annotation inference module 132, or annotation assistant, along with those of program checking tool 150, may be referred to as an annotation inference system 130. In particular, the annotation inference module is able to control the running of the program checking tool.

The annotation inference module 132 preferably includes:

a heuristic annotation generator 134 that parses computer program 118 and suggests one or more annotations, according to one embodiment of the present invention;

a W0 warning mapper 142 that turns warnings of a first kind, W0, generated by the program checking tool 150 into annotation modifications;

a W1 warning mapper 144 that turns warnings of a second kind, W1, generated by the program checking tool 150 into annotation modifications;

a program updater 140 that inserts annotations into, or removes annotations from, or modifies annotations in, computer program 118 according to suggestions associated with the annotation modifications in order to produce a modified computer program 120.

a counter example mapper 136 that maps counter examples 158 into annotation modifications 138; and one or more annotation modifications 138 corresponding to annotations from the candidate set that are refuted by the annotation inference system.

The program checking tool 122 preferably includes:

a verification condition generator 152 for optionally converting a program into a logical equation called a verification condition 162;

optionally, a theorem prover 154 that attempts to prove or refute the verification condition 162;

an analysis module 156 that converts counter examples into warning messages;

zero or more counter examples 158;

zero or more warning messages 160; and
at least one verification condition 162 corresponding to a procedure in computer program 118.

Figure 2:
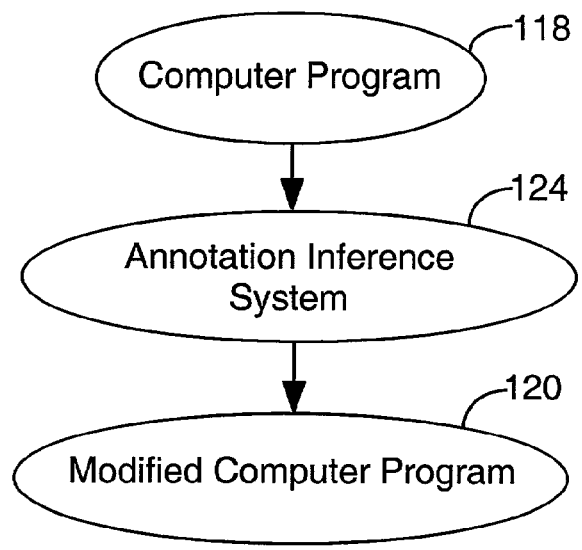
FIG. 2 is a flow chart showing the application of the annotation inference system to a computer program in order to generate a modified computer program.

Overview of Operation of an Annotation Inference System and Program Checking Tool The general scheme in which the present invention operates is presented in FIG. 2. A computer program 118 is passed to an annotation inference system 130 which produces a modified computer program 120 as output. The modified computer program 120 preferably contains one or more annotations that were not present in the original computer program 118 and which have been supplied by the annotation inference system. The original computer program 118 may itself already contain some annotations before it is passed to the annotation inference system.

Figures 3A, 3B:
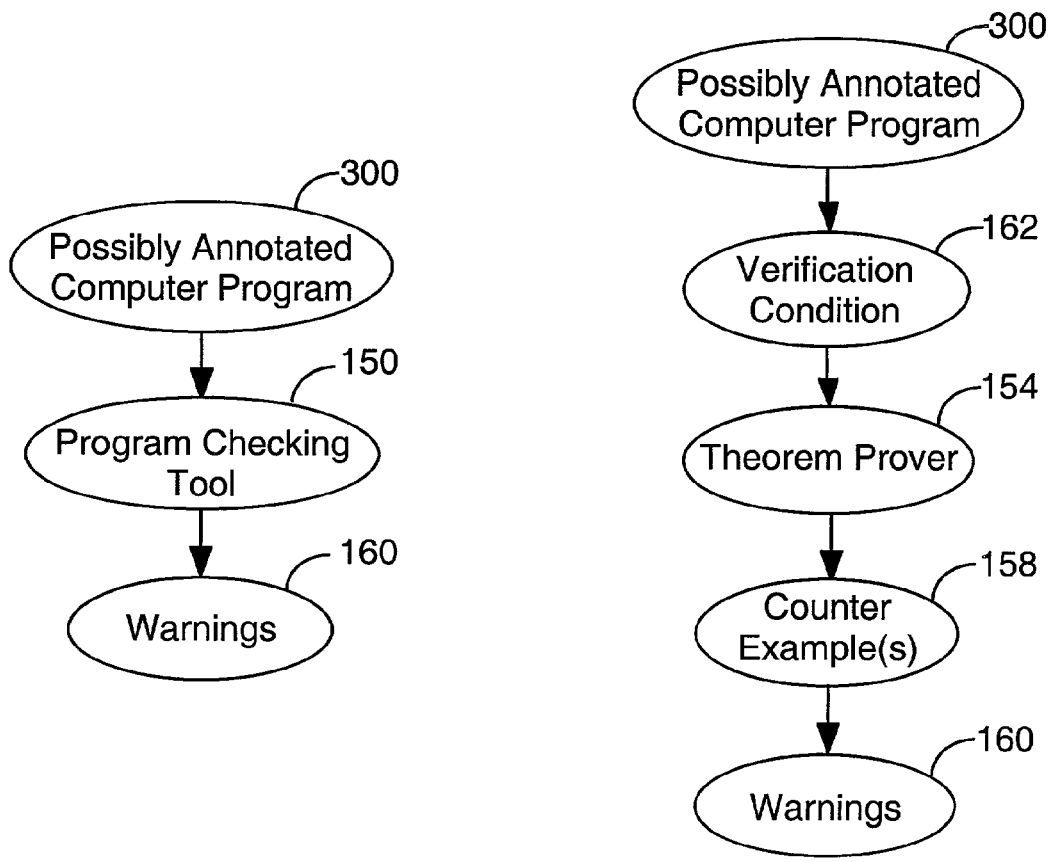
FIGS. 3A and 3B are flow charts showing the application of a program checking tool to an annotated computer program to generate warnings.

The annotation inference system of the present invention utilizes a program checking tool 150 that checks computer programs for defects, as shown in FIG. 3A. The tool itself takes as input a possibly annotated computer program 300 containing zero or more annotations. Where present, these annotations are initially the original set of annotations, Ann. Such annotations may have been heuristically generated. The annotations may indicate properties that are expected to hold or are supposed to hold at various program points and therefore help the program checking tool 150 check the program. The program checking tool is applied to the possibly annotated computer program 300 and zero or more warnings 160 are produced, possibly as a result of analyzing zero or more counter examples 158. The program checking tool is preferably a static checker. It could, for example, be a type checker, model checker, program interpreter or any similar program checker. Preferably the program checking tool is a modular checker. The program checking tool also preferably has an annotation language. Examples of commercially available program checking tools that could be used with the methods of the present invention include Lint, LCLint, the family of Extended Static Checkers (ESC) including ESC/Java and ESC/Modula-3, Purify, and Anna, an annotation language for Ada. It is to be understood that methods of the present invention are not construed to be limited to the foregoing list of program checking tools and neither is the absence of a commercially available tool from the foregoing list to be taken as an explicit expression that its operation is not compatible with the methods of the present invention.

Warning messages preferably contain a supporting explanation. For example, a null pointer dereference message may include a description, or a partial description of a program execution that could lead to the null pointer dereference. Similarly, a warning message describing an inferred property may include a proof of why that property holds.

FIG. 3B shows a preferred procedure of FIG. 3A, augmented to illustrate the internal workings of a preferred class of program checking tool. A preferred program checking tool uses a two-step approach to verifying the computer program. In a first step it converts each procedure in possibly annotated computer program 300 into a corresponding verification condition 162. For the purposes of the present invention, when discussing the conversion of a program into a verification condition, it is assumed that the verification condition can itself comprise one or more separate verification conditions corresponding to one or more procedures in the computer program. A verification condition is a predicate whose universal truth is tested by a theorem prover. Each annotation may appear in the verification condition zero or more times, possibly in some modified form. In a second step, one or more of the verification conditions are passed to an automatic theorem prover 154. The theorem prover refutes a verification condition if it contains an incorrect annotation, i.e., if there is a possible error in the corresponding procedure.

When it is unable to prove the truth of the verification condition, VC, the theorem prover ideally produces one or more counter examples 158. These counter examples can be processed by an analysis module 156 and transformed into one or more warning messages 160 that can be interpreted by a user. A discussion of counter examples and their transformation into warnings is outside the scope of this document, but a discussion may be found in commonly assigned pending U.S. patent application Ser. No. 09/754,890, entitled, "System and Method for Verifying Computer Program Correctness and Providing Recoverable Execution Trace Information," filed Jan. 5, 2001, incorporated herein by reference.

According to the methods of the present invention, the program checking tool may produce at least two kinds of warnings, preferably derived from counter examples. Each counter example contains sufficient information for the program checking tool to figure out whether it constitutes a warning of the first kind or a warning of the second kind.

Warnings of a first kind, denoted W0, are warnings about possible misapplications of primitive operations of the programming language. The set of primitive operations depends on the tool. For example, these warnings concern potential run-time errors, such as, but not limited to, dereferencing a null pointer, array access errors, function invocations and access of shared data. Such warnings indicate that the computer program may not work. In this case, the program checking tool may also offer suggested annotations that would eliminate the warnings. These warnings are generally useful for static debugging purposes but in the present invention are mapped into annotation modifications which suggest annotations that can usefully be inserted into the computer program by the annotation inference module.

Warnings of a second kind, denoted W1, alert a user about inconsistencies between the program and particular annotations. Such annotations, once removed, are sometimes called "refuted annotations." Warnings of the second kind occur if the program checking tool is not able to verify the program property claimed by an annotation, i.e., the annotation is inconsistent with the program. Examples of such annotations include assert statements, class invariants and procedure preconditions. For example, such a warning is generated if preconditions of a procedure are not satisfied at the call site of the procedure. The annotation assistant interprets such warnings as refuting incorrect guesses in the candidate annotation set. The warnings arising from annotations such as this are also mapped into annotation modifications that suggest the annotations that are preferably removed from the computer program by the annotation inference module. Warnings of the second kind typically arise from annotations that have been heuristically guessed and inserted into the program prior to using the program checking tool. Warnings of the second kind may also arise from annotations supplied by a user.

Additional warnings may be messages that arise from additional annotations inferred by the program checking tool and which are expected to hold on every execution. Examples of such inferred properties include loop invariants, additional type information and dynamically inferred program invariants.

Further additional warnings may be messages that arise from additional annotations inferred by the program checking tool and which the tool determines may not hold in some execution. Examples of such inferred properties include common post-conditions such as "the return value of a particular procedure is positive" and other common properties such as "a particular variable is never null." In a preferred embodiment, warnings arising from heuristically guessed annotations that have been refuted, are preserved and presented to a user as warning messages with accompanying explanations.

In a preferred embodiment, an annotation modification may be commented out instead of being explicitly deleted from the text of the computer program. That way, the annotation is no longer interpreted by a program checking tool but is still present and available to a user after subsequent modifications to the program.

In another preferred embodiment, a refuted annotation is both commented out and modified to contain a brief explanation of why it was refuted. Such an explanation can be prefaced by, or contain, a standardized character string so that a user can search the program for annotations that have been updated with explanations. Preferably, when a program checking tool presents its output to a user, the output contains a list of inferred annotations and refuted annotations. Accompanying each is preferably an explanatory message based on the modification to the annotation. These additional messages are particularly useful in identifying an original defect that may, for example, later lead to a misapplied primitive operation or violated annotation.

Explanations attached to warning messages are found to be particularly useful when describing refuted annotations or properties that do not hold. For example, a message refuting the property that a particular variable is never null may also identify an assignment statement where the variable may be given the value null. Preferably, explanatory messages accompanying properties that have been refuted are used in conjunction with explanatory messages that accompany related properties that are shown not to hold. For example, suppose a program checking tool outputs a warning message that a variable may be null in some dereference expression. The partial execution trace that may accompany this message may not include enough information to identify the origin of the problem. If the variable is intended to be non-null throughout every execution, this may confuse a user. However, if the user searches for the additional warning message that refutes the proposition that the variable is never null, then the explanation that accompanies that warning may identify a particular location or assignment statement where the variable may be given the value null.

Warnings and accompanying explanations may be presented to the user in many ways familiar to one of skill in the art. They are preferably presented to the user in the form of a version of the computer program, modified to contain specially-marked annotations. The explanation to the warning can preferably be presented as an in-line modification to the computer program, or separately in a file of explanatory material. If an accompanying explanation includes references to program points, for example, to a line where a property is refuted, then such references can be presented as hyperlinks to the referenced program point.

Thus, an annotation modification is either an instruction to remove a particular, refuted, annotation from the annotated computer program, or is an instruction to insert a new annotation into the computer program or can be an instruction to comment out or otherwise modify an annotation in the computer program.

It is understood that, while preferably a warning is mapped into an annotation modification, the counter example corresponding to the warning may alternately be mapped into the annotation modification.

The annotation inference module of the present invention solves the problem of producing a consistent set of accurate annotations by iteratively calling the program checking tool, using the warnings produced by the tool to guide the inference of annotations. The warnings are mapped into annotation modifications. The annotation inference module then modifies the computer program, either by inserting the inferred annotations into, or removing or commenting out refuted annotations from, the program so that successive applications of the program checking tool are able to produce a progressively updating set of annotations. Thus, the modified computer program that results contains a number of annotations that has changed relative to the number in the original computer program that is given to the program checking tool.

Houdini is an annotation assistant that embodies this approach (see, Flanagan, C., and Leino, K. R. M., "Houdini, an Annotation Assistant for ESC/Java," SRC Technical Note 2000-003, which also appears in: Flanagan, C. and Leino, K. R. M., "Houdini, an annotation assistant for ESC/Java," in *International Symposium of Formal Methods Europe* 2001: *Formal Methods for Increasing Software Productivity*, vol. 2021 *of Lecture Notes in Computer Science*, 500–517. Springer, (March 2001)) to make ESC/Java more useful in catching defects in legacy code. Essentially, Houdini conjectures heuristically a large number of candidate annotations for an unannotated program, many of which will be invalid, and then repeatedly uses ESC/Java, effectively treating it as a subroutine, to verify or refute each of these annotations.

The annotation inference module of the present invention includes two approaches to using the warnings, each of which is described below.

Inserting Annotations Based on Warnings of the
First Kind

Figure 4:
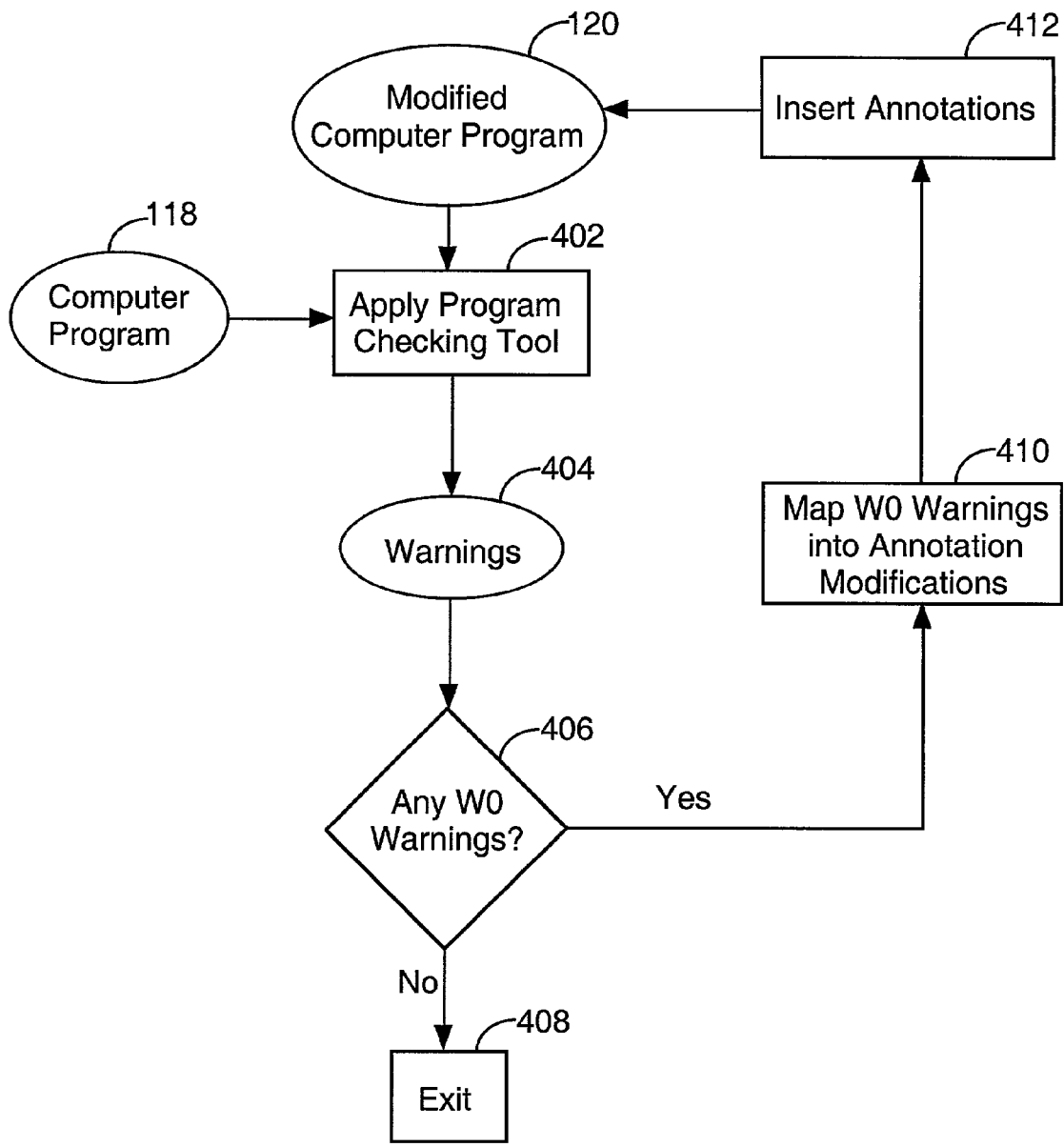
FIG. 4 is a flow chart showing one embodiment of the method of inferring annotations according to the present invention.

One embodiment of the annotation inference module of the present invention is described with respect to FIG. 4. The initial input is the computer program 118. At step 402, the program checking tool is applied to computer program 118 and a number of warnings 404 are produced. At step 406, the warnings are inspected to see whether there are any warnings of the first kind, i.e., W0 warnings. If not, (i.e., no warnings are suitable for mapping into annotation modifications) the annotation inference system exits, step 408, supplying the computer program in its most recent form. If there are warnings of the first kind, they are mapped into annotation modifications, step 410. In a preferred embodiment, the program checking tool produces counter examples which are themselves transformed into warning messages by analysis module 156. In such an embodiment, counter examples that correspond to W0 warnings can alternatively themselves be directly mapped into annotation modifications. At step 412, annotations suggested by the annotation modifications are inserted into the computer program to produce a modified computer program 120. Alternately, a subset of the warnings of the first kind may be mapped into annotation modifications, leaving others to be processed in future iterations.

Additionally, the program checking tool may infer and present additional properties that are expected either to hold or not to hold at every execution. Such properties can be used to derive further annotations that can be inserted into the program.

Steps 402 and 406 are repeated, applying the program checking tool to the modified computer program to produce warnings, and inspecting those warnings to see if there are any warnings of the first kind. If there are such warnings, they are mapped into annotation modifications, step 410, and inserted into the modified computer program, step 412. Steps 402, 406, 410, 412 are repeated until a modified computer program is produced from which no warnings of the first kind are produced upon application of the program checking tool, and, upon exit, step 408, such a modified computer program is provided to the user. Thus, in this embodiment, the annotation inference module iteratively applies the program checking tool to the computer program, until the tool no longer produces any W0-type warnings.

In practice, the insertion of an annotation based upon an annotation modification suggested by a warning silences the original warning. The stop condition when iterating is thus that the tool produces no more counter examples or warnings that can be mapped to annotation modifications that suggest annotations to add.

By way of illustration, the program checking tool may initially produce a warning that an array index variable could be out of bounds, for example because it becomes negative. Such a warning is mapped into an annotation modification that suggests that a useful annotation to insert is that the array index variable is always greater than or equal to zero. Provided that such a condition is an actual invariant, a subsequent run of the tool will not produce a further warning related to this property.

The insertion of new annotations into the program by the first embodiment of the present invention may produce a large number of new warning messages, in which case it may be desirable to put in an upper bound on the number of warning messages that the program is to consider.

Removing Annotations Based on Warnings of the Second Kind

In pseudo-code, another embodiment of the annotation inference module can be expressed as follows:
  use heuristics to generate candidate annotation set; repeat
    apply program checking tool and refute annotations;
    remove, comment out, or modify refuted annotations;
  until quiescence.

This embodiment of the method of the present invention finds the largest subset of the original annotations that is valid for the program. The algorithm employed starts with the original set of annotations, Ann, and removes annotations from it until a valid subset is reached.

The original set of annotations may comprise annotations originally present in the program as well as a candidate set of annotations heuristically guessed and inserted into the program by the annotation inference system 130. For the purposes of the methods of the present invention, preferably those annotations corresponding to the candidate set of annotations are refuted and subsequently removed.

The candidate annotation set is a finite set generated from the program text and heuristics specific to the program checking tool about what annotations are possible and/or likely to apply to the program. The candidate set of annotations may contain many annotations that are wrong and easily refutable. The main advantage in using a heuristically set derived automatically is that there is a labor-saving. Even if only a few annotations in the candidate set survive refutation, it will ultimately be useful to have them in the computer program. The candidate annotation set is described hereinbelow.

Application of the program checking tool inside the loop produces warnings about portions of the program that violate some of the given annotations. The annotation inference module interprets such warnings as identifying incorrect annotation guesses in the candidate set. In this sense, an application of the program checking tool has the effect of refuting some number of candidate annotations. The net effect of the loop is to remove incorrect candidate annotations from the program. It is understood that an annotation can also be effectively removed from further consideration by commenting it out from the program, as described hereinbelow. Thus, the annotations remaining upon termination comprise a correct subset of the candidate set.

In a preferred embodiment, warnings associated with refuted annotations are preserved and, preferably with an associated explanation, presented to the user upon termination of the program checking tool.

In the case where the program checking tool is an extended static checker, it is possible to optimize the iterative scheme by introducing annotation guards into a verification condition produced by the checker. In this way, as is described in concurrently filed U.S. patent application, Ser. No. 10/007,113, entitled "Method and Apparatus for Automatically Inferring Annotations for an Extended Static Checker," the annotation guards rather than the computer program are updated at each iteration and the verification condition does not need to be recomputed at each iteration.

Since removing one annotation may cause subsequent annotations to become invalid, the check-and-refute cycle iterates until a fixed point is reached. The process terminates because, until a fixed point is reached, the number of remaining candidate annotations is strictly decreased with each iteration. The resulting annotation set is clearly a subset of the original set, and is valid with respect to the static checker, that is, the static checker does not refute any of its annotations. The inferred annotation set is in fact a valid subset of the candidate set. In fact, it is the greatest subset whose validity can be established consistent with other members of the candidate set. Furthermore, this maximal subset is unique. For a proof of these properties, and also a more efficient version of the basic algorithm presented here, see Flanagan, C., et al., "Annotation Inference for Modular Checkers," *Information Processing Letters,* 77:97–108 (February, 2001).

As an example of why the refutation of one annotation may cause subsequent annotations to become invalid, consider a candidate annotation, x>0, as a precondition for procedures $f_1$ and $f_2$ wherein procedure $f$ calls procedure $f_2$. If the program checking tool finds that, elsewhere in the program, procedures sets x=−5 prior to callings, then the precondition on $f_1$ is removed. On a subsequent application of the program checking tool, a warning will be generated for the precondition on x as applied to $f_2$.

Figure 5:
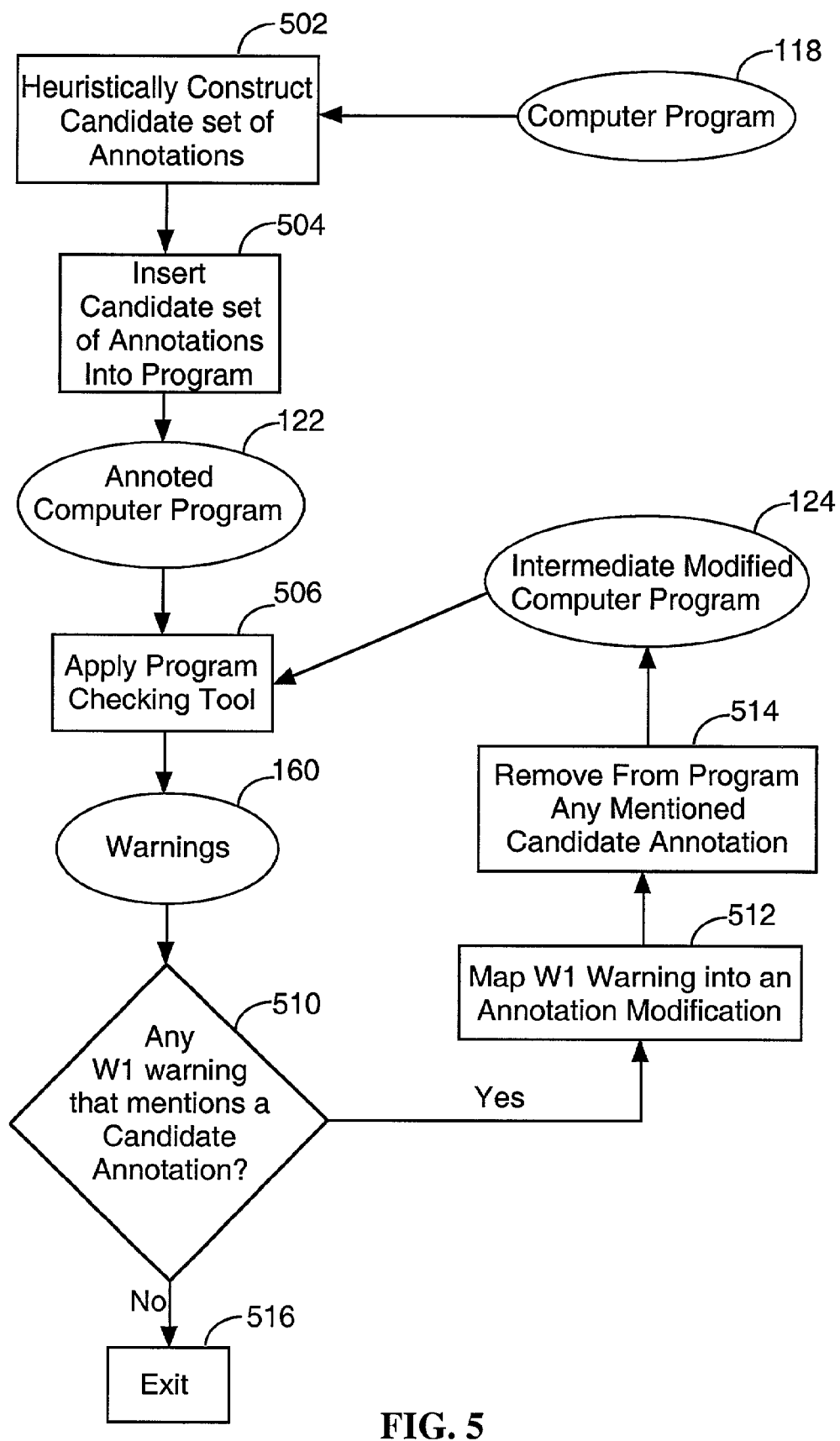
FIG. 5 is a flow chart showing a second embodiment of the method of inferring annotations according to the present invention.

This embodiment of the annotation inference module of the present invention is described with respect to FIG. 5. The input is the computer program 118. This embodiment of the annotation inference module starts by heuristically constructing from the program a finite candidate set of annotations, step 502. Ideally, the candidate set is sufficiently large to include all annotations that may be useful when applying the program checking tool to the program.

The annotation inference module inserts the candidate annotations into the program, step 504, to produce an annotated computer program, 122. Then, the module iteratively applies the program checking tool to the annotated program, producing at each stage, an intermediate modified program. By applying the program checking tool at step 506, warnings 160 are produced. The module inspects all warnings of the second kind i.e., W1 warnings, produced by the tool, step 510, and, if there are no warnings of the second kind, exits, providing the user with the modified computer program. If there are warnings of the second kind, at least one such warning is mapped into an annotation modification, step 512. Any candidate annotation mentioned in these warnings is refuted, i.e., is removed from, or commented out of, the computer program at step 514, to create an intermediate modified computer program 124. The program checking tool is then applied to the intermediate modified computer program 124 again at step 506. Steps 506, 510, 512, and 514 are repeated until the tool no longer produces any W1 warnings that are suitable for mapping into annotation modifications. In a preferred embodiment, such warnings are those that involve a candidate annotation. The loop exits, providing the user with a modified computer program, preferably accompanied by explanations attached to warning messages.

In one embodiment, refuted annotations are not explicitly removed from the computer program but are commented out. For example, if the computer program is written in the Java programming language, commented out portions of the program are those found in between the opening and closing character strings "/*" and "*/" respectively. In one embodiment, such strings are added before and after an annotation, instead of deleting the annotation itself. Thus, in such an embodiment, refuted annotations are found in between the character strings "/*" and "*/".

In a preferred embodiment, the commenting characters are supplemented in such a way that annotations can be readily distinguished from other commented out portions of code. For example, if the first character inside the comment is "@" (in which case the opening comment character string would be "/*@") the portion of code contained within the commenting characters is treated as an annotation. In this example, commenting out the annotation may be accomplished by deleting the "@" symbol. It is understood that many other alternative labeling schemes can be employed to produce an equivalent result. For example, in another embodiment, annotations that have been inserted by the heuristic annotation generator are found between character strings such as "/* @@" and "*/".

In another preferred embodiment, an annotation is not only commented out, but a brief explanation of the reason why it was refuted is inserted into the code. For example, characteristic character strings such as "REMOVED" and "BECAUSE . . . " can be inserted within the annotation. Such an embodiment is especially preferred because the program checking tool preferably displays warnings and valid annotations to the user after iterations have converged. Valid annotations, i e., those that were correctly guessed and have not been refuted, are useful but, in practice it is more useful to present refuted annotations and reasons for their refutation. When refuted annotations are preserved in the computer program and modified to contain a reason for refutation, the annotation inference system can be set so that their details can also be presented to a user.

General Observations

Each of the embodiments of the present invention illustrated in FIGS. 4 and 5 can be interrupted before reaching its termination condition if it is desired to make a trade-off between execution time for the annotation inference step and obtaining results of full annotation.

A tandem application of both of the embodiments of the present invention illustrated in FIGS. 4 and 5 can also be envisaged. For example, starting with an unannotated program, a candidate set of annotations could be heuristically derived, inserted into the program and iteratively removed according to the second embodiment of the present invention. Those annotations that remain can be supplemented with annotations that are suggested by warnings of the first kind obtained by running the checking tool again. Alternatively, those annotations that are inserted as a result of inspecting warnings of the first kind could be removed if they give rise to warnings of the second kind in subsequent applications of the program checking tool.

Work List Ordering Heuristics

In a preferred embodiment, an algorithm according to a method of refuting annotations according to the present invention, maintains a work list, W, that contains the procedures that are still unchecked with respect to the current set of annotations. When checking a procedure, $f$, from W, any candidate annotations in the current set that are not valid for $f$, are removed from the current set and the work list is extended with the procedures that assume any of the refuted annotations. The algorithm terminates when the work list becomes empty and at this point the current set of annotations becomes the largest valid subset of Ann.

The methods of the present invention, as described hereinabove, are independent of how the procedures in the work list are chosen. Nevertheless, how this choice is made can have a significant impact on the performance of the method. Some heuristics for ordering the procedures in the work list can usefully be employed. A method of the present invention employing an extended static checker, in which the verification condition is not regenerated, facilitates the use of such work list ordering heuristics.

One category of heuristics comprises the "fastest-first" and "slowest-first" heuristics. Consider a program containing a procedure $f_0$ with a precondition a and containing two procedures $f_1$ and $f_2$ that each calls $f_0$ without establishing a. In such a scenario, analyzing either $f_1$ or $f_2$ will uncover the invalid precondition a, and the overall performance may be improved by preferring the procedure with the "faster" verification condition. Clearly, it is not possible to avoid analyzing procedures with "slow" verification conditions completely: sooner or later every procedure in the work list must be checked. Nevertheless, using this heuristic, it is hoped to reduce the number of times that the slow verification condition is analyzed.

A "fastest first" ordering heuristic is implemented by timing each verification task and associating with each procedure the amount of time it takes to check its verification condition. When the algorithm selects the next procedure for verification, it chooses the one that took the least time the last time it was analyzed.

A different strategy is to order the jobs by "slowest first." This heuristic may be useful in a multi-processor setting in which tasks are distributed over two or more processors, since it may allow slow jobs to get a "head start."

The "no overlap" heuristic tries to avoid superfluous analysis, as can occur in a multiple-processor environment. For example, when running the distributed algorithm on a large test case, most of the time at least two processors were assigned the same procedure. While seemingly contradictory, this situation is actually possible and likely to occur. It arises when a processor i is analyzing a procedure f while another processor refutes some annotation that is assumed by f. The algorithm then reinserts f into the work list and can assign it to an idle processor j before processor i finishes its verification of f.

One preemptive approach to implement a "no overlap" heuristic is to abort the older verification task since it is subsumed by the new one. (By monotonicity of an extended static checker, as described hereinbelow, the annotations refuted by the older task would also be refuted by the newer task.) This strategy may be profitable if many of the annotations that the older task will refute have already been refuted by other jobs.

Another, non-preemptive, approach is to not pick procedures that are currently being checked. This strategy may be profitable, for example, if the verification of f spends a lot of time before it starts analyzing those annotations that are not in the final annotated version of the program.

Candidate Annotations

The candidate annotation set is a finite set generated from the program text using heuristics, specific to the program checking tool, about what annotations are possible and/or are likely to be applicable to the program.

To facilitate static analysis, procedures can be annotated with preconditions and postconditions. A precondition of a procedure specifies that a particular boolean expression holds in the pre-state of every invocation of the procedure. A postcondition specifies that a pre-post state relation holds of every invocation of a procedure. For example, a postcondition may stipulate that a procedure does not change the value of a particular variable. Callers are responsible for establishing preconditions, and procedure implementations establish postconditions.

Ideally, the candidate set of annotations includes all annotations that may be useful in determining the program's correctness. However, it is also desirable to keep the candidate set reasonably small, because the running time of the tool is closely related to the number of candidate annotations. From the candidate set of annotations, the annotation inference system infers a subset of annotations that holds for all reachable states.

For correctness reasons, all candidate annotations that apply to the program's entry point are required to hold at the program's initial state. Methods of devising a set of candidate annotations are described in Flanagan, C., and Leino, K. R. M., "Houdini, an Annotation Assistant for ESC/Java," SRC Technical Note 2000-003, which is incorporated herein by reference.

Program entry points such as "main" do not have call sites that are visible to the annotation inference module. Therefore it is required that the candidate preconditions for program entry points be correct. That is, they must hold in the initial state of the program. Similarly, any candidate invariants on global variables must hold in the initial state.

Based on an inspection of a variety of hand-annotated programs and on experience with experimental implementations of the invention, the following heuristics for generating candidate annotations have been developed.

For any field f declared in the program, candidate invariants for f are guessed based on the type of f, as shown by way of illustration in Table 1. These candidate invariants are used in a preferred embodiment. It is to be understood that other embodiments employ alternative candidate invariants, in place of, or in addition to, those shown in Table 1, and with different notations.

TABLE 1

| Type of f | Candidate invariants for f |
| --- | --- |
| reference type | //@ invariant f != null; |
| boolean | //@ invariant f == true; |
|  | //@ invariant f == false; |
| integral type | //@ invariant f cmp expr; |
| array type | //@ invariant f != null; |
|  | //@ invariant \nonnullelems(f); |
|  | //@ invariant f.length cmp expr; |
|  | //@ invariant (\forall int z; |
|  | (0 <= z && z < expr) ==> f[z] != null); |

The notation used in Table 1 for candidate invariants is as follows. In the programming languages Java and C++, the string "/*" and "*/" are used to denote a 'comment,' i.e., to denote that what follows on the same line is to be ignored by a compiler. In a preferred method of the present invention, the string "//@" denotes that what follows on the same line of the program is to be interpreted as an annotation by a program checking tool such as ESC/Java. The word "invariant" is followed by a condition that applies to variable f. Such a condition is to hold throughout the program or at relevant program points, such as procedure calls or returns. The terms "\nonnullelems" and "\forall" are only recognized in a tool such as ESC/Java (though they are otherwise used in JML—Java Modelling Language, see for example www.cs.iastate.edu/~leavens/JML.html).

In Table 1, "cmp" represents any of the six comparison operators <, <=, =, !=, >=, and >. The operand "expr" is either an earlier integral field defined in the same class, i.e., defined within the same scope, of the computer program or an "interesting constant." Interesting constants include one of the numbers −1, 0, 1, or a constant dimension in an array allocation expression. For each field f of an array type, the annotation inference system also guesses a number of inequalities regarding f.length.

The annotation assistant also guesses candidate invariants that help verify the absence of null dereference errors. For each field f of a reference type, it guesses:

f!=null.

For each field f of an array type, in addition to guessing the invariant "f!=null," the annotation assistant also guesses the invariant "\nonnullelements(f)," which states that each entry in the array is not null, and it guesses an invariant that all entries in f up to expr (a field or an interesting constant) are not null. This last property has been found to be useful in reasoning about the behavior of stack-like data structures implemented using arrays.

Candidate preconditions and postconditions are generated in a similar manner for every method and constructor declared in a program written in Java. For application of the methods of the present invention to programs written in languages other than Java, similar principles apply to functions, classes, routines and procedures as applicable, as would be understood by one of skill in the art. In the annotation format used in ESC/Java, the "requires" keyword declares a precondition and the "ensures" keyword declares a postcondition. Candidate preconditions may relate two argument variables to one another, or may relate an argument variable to a field in the same class. An example of a candidate precondition is:

```
//@ requires f !=null;
``` in which "f" is a parameter.

Candidate postconditions may relate the result variable, "\result," to either argument variables or fields. An example of a candidate postcondition is:

```
//@ ensures j==n||\result!=null;
```

In addition, the candidate postcondition

```
//@ ensures \fresh(\result);
``` which states that the result of a method is a newly-allocated object, is generated. Preferably such a candidate postcondition is generated for every method or constructor of a program written in Java, or for a program written in some other language, each procedure, routine or function, as applicable.

As an aid in identifying code which is never accessed, i.e., dead code, the candidate precondition

```
//@ requires false;
``` is preferably generated for every routine in the program. If one if these preconditions is not refuted, then it is known that the corresponding routine is never called. Similarly, candidate postconditions

```
//@ ensures false;
``` are generated to identify routines that never return normally. Preferably such candidate postconditions and preconditions are generated respectively for every method or constructor of a program written in Java, or for a program written in some other language, for every procedure, routine or function, as applicable.

For correctness reasons, it is also required that all applicable candidate annotations hold in the program's initial state. Hence, for the program entry point "public static void main (String args[]) { . . . }", only the following precondition is generated, which is ensured by the Java run-time system:

```
//@ requires \nonnullelements(args);
```

A similar precondition can be generated for programs written in language other than Java.

The candidate set is permitted to contain contradictory annotations. For example, if a class declares an integral field f, the annotation assistant will guess several invariants, including, for example:

```
//@ invariant f<0;
```

```
//@ invariant f>=0;
```

At least one of these preconditions will be refuted when the annotation inference module checks a call site of this procedure.

Generation of Verification Conditions

In a preferred embodiment, the program checking tool 150 is an extended static checker such as ESC/Java or ESC/Modula-3. In another preferred embodiment, program checking tool 150 is rccjava (see, for example, Flanagan, C. and Freund, S., "Detecting race conditions in large programs," in, *Workshop on Program Analysis for Software Tools and Engineering* (PASTE 2001), (ACM, June 2001)). In a preferred embodiment, the program checking tool generates a verification condition, though any program or programs that provide access to a verification condition generator would suffice for this purpose.

In an especially preferred embodiment, the transformation of the annotated computer program 122 into the verification condition itself occurs via a two-stage process (as described in: K. R. M. Leino, J. B. Saxe and R. Stata, "Checking Java programs via guarded commands," *SRC Technical Note* 1999–002, Compaq Computer Corporation, (May 21, 1999), also available in *Formal Techniques for Java Programs*, Workshop proceedings, Ed. B. Jacobs, et al., Technical Report 251, Fernuniversität Hagen, (1999), incorporated herein by reference). The computer program source statements are first converted into an intermediate language, and then weakest precondition operators are used to process the intermediate-language statements into verification conditions (as described in U.S. Pat. No. 5,987,252 which is hereby incorporated herein by reference).

In a preferred embodiment, the intermediate form of the computer program is expressed in a particularly simple programming language that has no procedure call statements. Instead, the conversion to intermediate language replaces each call by its meaning according to the called procedure's pre- and postcondition annotations. In a preferred embodiment, the intermediate programming language utilizes guarded commands. For a description of guarded commands, see E. W. Dijkstra, *A Discipline of Programming*, Prentice-Hall, (1976). Other examples of guarded commands derived from Dijkstra are described elsewhere (see, e.g., G. Nelson, "A Generalization of Dijkstra's Calculus", *ACM Transactions on Programming Languages and Systems,* 11(4): 517–561, (1989), incorporated herein by reference). Accordingly, it will be understood by one of skill in the art that the methods of the present invention are not limited to any particular set of guarded commands but are applicable to Dijkstra's original commands and many other variations thereof. The conversion of Java programs to a set of guarded commands is described in: K. R. M. Leino, J. B. Saxe and R. Stata, "Checking Java programs via guarded commands," *SRC Technical Note* 1999–002, Compaq Computer Corporation, May 21, 1999.

The intermediate language contains assert and assume statements that bear labels, so as to keep track of whether the statement originated in the source or was generated on behalf of some annotation, and if so, which one. The labels of assert statements are used by the program checking tool to keep track of which annotations are to be refuted.

The intermediate form of the program is processed by the verification condition generator 152 to produce a verification condition 162 for the program. The verification condition (VC) is a first order logical formula built up from the constants "false" and "true," atomic boolean program expressions such as equality and inequality relations between program variables, the usual boolean connectives, and universal quantification. Additionally, the formula can be labeled by an annotation or program location, yielding a labeled formula. While the labels do not change the meaning of the underlying formula, they provide information to the subsequent operation of the program checking tool.

In a particularly preferred embodiment, the verification condition generator 152 can produce a guarded verification condition 142 for the program, without first producing a verification condition, as described in concurrently filed U.S. Pat. No. application, Ser. No. 10/007,113, entitled "Method and Apparatus for Automatically Inferring Annotations for an Extended Static Checker." A guarded verification condition is a verification condition that has one or more annotation guards, corresponding to annotations in the computer program.

In a preferred embodiment, the logical formula is expressed as a "weakest precondition." The weakest precondition of a statement, S, with respect to a postcondition R is the formula that characterizes those initial states from which the execution of S does not go wrong and terminates only in states satisfying R. Methods of expressing weakest preconditions for statements expressed in guarded commands are given by Dijkstra (see, E. W. Dijkstra, *A Discipline of Programming*, Prentice-Hall, (1976)). The logical formula is typically represented as a tree of sub-expressions. Various subsets and combinations of the sub-expressions must be conclusively proved to be true for all possible program conditions.

Application of the Theorem Prover

In a preferred embodiment, the verification condition 162 is passed to a theorem prover 154 whose job is to evaluate the sub-expressions of the VC, for all possible program conditions, to determine which ones (if any) it cannot conclusively prove to be true. Failure to prove sufficient combinations of sub-expressions to always be true means that one or more of the pre-conditions or postconditions required for proper operation of the program is not satisfied, or may potentially not be satisfied.

Even if a verification condition, $VC_f$, for a procedure $f$, is found to be not valid, thus indicating that an invocation off may violate some annotation, in order to indicate which annotation is violated it is preferable to introduce some extra machinery. Identifying invalid annotations can utilize a mechanism of exposing a labeled subformula in a VC. This is accomplished by defining an appropriate function, expose, such that a formula, R, refutes an annotation a, if expose(a, VC) is not valid. A definition of expose is given with a discussion of mathematical formalisms, hereinbelow.

Using Guarded Verification Condition Expressions

Referring to FIG. 1, in another embodiment of the present invention the program checking tool 150 includes a verification condition generator 152 for converting a program into a logical equation called a guarded verification condition. The guarded verification condition includes a number of guarded verification terms. The "guards" of the guarded verification condition correspond to the program annotations. Each of these guards is assigned a truth value, and the set of truth values for all the guards in the verification condition is called the guard truth vector. The program checking tool 150 includes a theorem prover 154 that attempts to prove or refute the guarded verification condition, where the truth value of each of the guards in the verification condition are set in accordance with the current state of the guard truth vector. A guard truth vector updater updates the guard truth vector by setting to false the truth value of the guards corresponding to refuted annotations, if any.

The program checking tool operates as described above with reference to FIG. 5, except as follows. The first time the program checking tool is applied to the annotated program, the program is converted into a guarded verification condition which is then evaluated with the theorem prover 154. At each subsequent iteration of the main loop of the procedure, the theorem prover is re-executed without regenerating the verification condition. Instead, the guarded verification condition is evaluated in accordance with the current state of the guard truth vector. Furthermore, the guard truth vector is updated so as to set to "false" the truth value of each guard that corresponds to a refuted candidate annotation. Such a method is described in concurrently filed and commonly assigned U.S. Pat. No. application, Ser. No. 10/007,113, entitled "Methods and Apparatus for Automatically Inferring Annotations for an Extended StaticChecker," previously incorporated by reference.

Mathematical Formalisms

Some questions arise about the correctness of the annotation assistant. For example, whether or not the annotation assistant terminates with a unique answer; whether or not the order in which the checker is invoked on the various parts of the program matters; whether the checker needs to be applied to all parts of the program or the verification condition on every iteration; and upon which properties of the checker the annotation assistant relies. Such details are also to be found in: Flanagan, C., Joshi, R., and Leino, K. R. M., "Annotation Inference for Modular Checkers," *Information Processing Letters*, 77:97–108 (February, 2001), incorporated herein by reference.

These issues can be addressed formally, adopting the following notational conventions. The power set of X is written PX. Following Dijkstra (Dijkstra, E. W., and Scholten, C. S., *Predicate Calculus and Program Semantics*, Texts and Monographs in Computer Science, Springer-Verlag, 1990), a left-associative infix "." (binding stronger than any other operator) is used to denote function application. The expression $\{x|r.x::t.x\}$ denotes the set of terms of the form t.x for all x satisfying the range expression r.x. For Q denoting ∀, ∃, or any associative operator that is symmetric on the elements of $\{x|r.x::t.x\}$ (for example, the union operator, ∪), the expression $<Qx|r.x::t.x>$ denotes the application of Q to the elements of $\{x|r.x::t.x\}$. If the range expression is true, the "|true" may be omitted.

The Extended Static Checker, ESC∈Proc×P Ann→P Ann, is defined by the equation:

$$ESC(p,A) = \{a | a \in A \wedge [\text{expose}(a, VC(p, A))] :: a\}$$

where VC is a verification condition and the item in square brackets is the validity testing operator. The invocation ESC(p,A) returns the set of annotations in A not refuted by p.

The function expose∈Ann×Formula→Formula, wherein Formula represents the syntactic class of formulae from which a VC can be composed, is defined by:

$$\text{expose}(a, (\text{label } b : e)) = \begin{cases} e, & \text{if } b = a \\ \text{True}, & \text{otherwise} \end{cases}$$

expose(a,R)=map(<λQ::expose(a,Q)>, R) if R is not a labeled formula.

In the definition of expose, the argument (label b:e) is a labeled formula such that formula e is labeled by an annotation or program location, b. Thus, a formula R refutes an annotation, a, if expose(a,VC) is not valid.

A modular checker checks a program one part at a time. The parts of the program on which the checker operates are referred to as "units of checking," or simply as "units." For some checkers, a unit of checking may be a routine such as a procedure, method, or constructor. For other checkers, a unit may be a larger construct such as a module, package, or class. Let Unit denote the set of possible units of checking. The internal structure of these units is of no concern: it is simply assumed that a program P ⊆ Unit is a finite set of units and that a program checking tool, or checker, C, can check these units.

While checking each unit, the checking tool relies on annotations specifying properties of the other units in the program. Ann is used to denote the set of possible annotations, and whenever the program checking tool C is invoked on a unit $f$ in Unit, a set of annotations A ⊆ Ann is preferably also provided.

Warnings of the second kind, as described hereinabove, indicate annotations that should be refuted. During the checking process, the program checking tool may discover that the unit $f$ is not consistent with some annotation in A (for example, $f$ may be a procedure that fails to ensure one of its postconditions). In this case, the checker refutes the annotation. To simplify the analysis, the checker is formalized to be a function that returns the set of annotations in A that the checker fails to refute:

$$C: \text{Unit} \times P \text{ Ann} \rightarrow P \text{ Ann}. \quad (1)$$

The annotation inference module assumes two underlying properties of the program checking tool. The first property is that the set of annotations returned by the tool is a subset of those to which the tool is applied:

$$<\forall f, A | f \in \text{Unit} \wedge A \subseteq \text{Ann} :: C.f.A \subseteq A>. \quad (2)$$

The second property is that the program checking tool satisfies the following monotonicity property:

$$<\forall f | f \in \text{Unit} :: C.f \text{ is monotonic}>. \quad (3)$$

Intuitively, if an application of the program checking tool does not refute a particular annotation, then passing additional annotations to the tool does not cause that same annotation to be refuted either.

For convenience, C can also be overloaded ("lifted") to apply to sets of units: for any set F ⊆ Unit, $$C.F.A = <\cap f | f \in F :: C.f.A > \cap A \quad (4)$$

Properties (2) and (3) for a program checking tool imply analogous properties for the lifted checking tool. Furthermore, for any unit $f$ that is an element of a set of units F, and set of annotations A, the following hold:

$$f \in F \rightarrow C.F.A \subseteq C.F.A \quad (5)$$

$$f \in F \wedge C.F.A \rightarrow C.f.A \quad (6)$$

Property (5) means that applying the checker to a larger set of code F increases the opportunity for refuting annotations in A. Thus, the set of unrefuted annotations C.F.A is necessarily a subset of the set of unrefuted annotations C.f.A.

Accordingly, it is said that an annotation set A is valid for a program P if C.P.A=A, that is, if program checking tool C does not refute any of the annotations in A. It follows from properties (2) and (3) that validity is closed under union. Hence, for any program P and annotation set A, there is a unique greatest subset of A that is valid for P.

An annotation assistant is a program that, for a given (finite) candidate annotation set G and a program P, computes the greatest subset of G that is valid for P. Formally, an annotation assistant computes a set B such that:

$$B \subseteq G \quad (7)$$

$$C.P.B = B \quad (8)$$

$$<\forall X | X \subseteq G \wedge C.P.X = X :: X \subseteq B> \quad (9)$$

The following program implements an annotation assistant.

B:=G;
while C.P.B!=B do
    choose X such that C.P.B ⊆ X ⊆ B;
    B:=X;
end

The body of this loop picks a set X that satisfies the given range expression and then sets B to X. The loop terminates when no such X exists.

The program satisfies the specification of an annotation inference module. It is not hard to prove, using property (2), that properties (7) and (9) together are a loop invariant. By property (2), the negation of the loop guard is property (8). Termination follows from variant function |B|, which is strictly decreased by the loop body.

Note that this program can remove from B any annotation that C.P.B refutes; it need not contract B to C.P.B itself. Thus refuted annotations can be removed from B in any order.

Accordingly, the two properties (2) and (3) of the program checking tool imply that the basic annotation inference algorithm converges on a unique fixed-point, regardless of the order in which annotations are refuted and removed.

EXAMPLES

Example 1

Heuristic Generation of Annotations

TABLE 2

Example program for which annotations are generated.
Line numbers as shown in the left hand column.

| | |
|---|---|
| 0 | int a[100]; |
| 1 | int b[50]; |
| 2 | int m; |
| 3 | int n; |
| 4 | int x := 0; |
| 5 | int y := 0; |
| 6 | while (x < 100) { |
| 7 |   m := a[x]; |
| 8 |   n := b[y]; |
| 9 |   x := x+2; |
| 10 |   y := y+1; |
| 11 | } |

Applying a conventional program checking tool to the program shown in Table 2 produces the following warning:

Line 8: possible array index out of bounds.

An annotation inference module according to the first embodiment of the present invention, i.e., of the kind that adds annotations may, in response to the warning insert an annotation that specifies "y<50". However, this is not a correct loop invariant, i.e., a property that holds on entry to the loop and holds throughout the loop. A proper loop invariant is "y≦50". The actual suggested annotation is not provable by the program checking tool because a further piece of information is required, viz: 2y=x. Effectively, the program checking tool only uses one iteration of the loop to make inferences.

Other possible suggested annotations are that either x or y must not be negative. So, other possible annotations include "0≦x" and "0≦y". Each of these would be provable by the tool.

By contrast, an annotation inference module according to the second embodiment of the present invention first guesses many annotations and then lets the underlying tool refute them. For the program shown in Table 2 hereinabove, the annotation inference module may guess the annotations shown in Table 3 hereinbelow.

TABLE 3

Candidate set of annotations heuristically
derived for the program in Table 2

0 <= x
0 <= y
x <= 50
y <= 50
x <= 100
y <= 100
y <= x
x even
x odd
y even
y odd The rationale behind the annotations in the candidate set is as follows. Zero (0) is important to many programs, especially as a likely lower bound to an array index variable such as x or y. The integer fifty (50) appears in the program text as the length of array "b", and hence may also be an important value. Similarly, the integer one hundred (100) appears in the program text as the length of array "a". Other guesses utilize the variables in various possible conditions.

After repeatedly calling a program checking tool to refute these annotations, the set of annotations shown in Table 4 hereinbelow remains.

TABLE 4

Set of Annotations remaining in the program of Table 2
after iteratively applying a program checking tool 0 <= x
0 <= y
x <= 100
y <= 100
y <= x
x even Note that the loop invariant "y<=50" has been refuted, despite the fact that it is true in all executions. The reason for this is that there is no explicit link between the variable y and the array incrementing variable, x and the bounds of execution of the loop. Had the heuristic annotation generator also guessed a condition like "y+y=x", then both "y<=50" and "y+y=x" would have remained unrefuted.

Note also that a condition like "x=0 ⊆x>=2" is a loop invariant, but it was not guessed by the annotation assistant in this example.

Example 2

Use of Verification Conditions

A preferred program checking tool used in example 2 is an extended static checker, ESC/Java, a tool for finding common programming errors in Java programs. ESC/Java takes as input a Java program, possibly annotated with ESC/Java light-weight specifications, and produces as output a list of warnings of possible errors in the program. Because of its static and automatic nature, its use is reminiscent of that of a type checker. However, ESC/Java is powered by a more precise semantics engine than most type checkers and uses an automatic theorem prover.

ESC/Java performs modular checking: every routine (method or constructor) is given a specification. ESC/Java checks that the implementation of each routine meets its specification, assuming that all routines called meet their specifications. The specification comes from user-supplied annotations. ESC/Java does not trace into the code of a callee, even if the callee code is also given to the tool to be checked. By performing modular checking, ESC/Java can be applied to a single class, or even a routine, at a time, without needing the entire program.

To demonstrate the operation of the embodiment that utilizes verification conditions, consider an example of a computer program 120 that comprises two modules, "main" and "timestwo," shown in Table 5:

TABLE 5

Example Program for Demonstrating Refutation of Candidate Annotations.
Line numbers of the two functions are shown at the left hand side.

| 1 | void main( ) { |
|---|---|
| 2 | int x = 5; |
| 3 | int y = timestwo(x); |
| 4 | //@ assert y >= 0; |
| 5 | } |
| 1 | int timestwo(int n) { |
| 2 | return 2*n; |
| 3 | } |

The first step is for the heuristic annotation generator to guess candidate annotations (step 502) and to insert them into the program (step 504). For this example, an annotated computer program 122 that results is shown in Table 6.

TABLE 6

Computer Program of Table 5 Annotated with Candidate Set

```
void main( ) {
    int x = 5;
    int y = timestwo(x);
    //@ assert y >= 0;
}
//@ requires n >= 0;      // candidate annotation 1
//@ requires n < 0;       // candidate annotation 2
//@ ensures \result >= 0; // candidate annotation 3
//@ ensures \result < 0;  // candidate annotation 4
int timestwo(int n) {
    return 2*n;
}
```

A program checking tool such as a static checker, as described above (i.e., using the procedure shown in FIG. 5 and described above), would process this program as follows. First, it would generate verification conditions VC_main and VC_timestwo for the two modules respectively:

VC_main is given by:

$x=5 \rightarrow x \geq 0 \wedge x<0 \wedge (y \geq 0 \wedge y<0 \rightarrow y \geq 0)$.

VC_timestwo is given by:

$n \geq 0 \wedge n<0 \wedge result=2*n \rightarrow result \geq 0 \wedge result<0$.

In the foregoing expressions "$\rightarrow$" means IMPLIES, "$\wedge$" means AND, and "$\wedge$" binds more strongly than "$\rightarrow$." Each verification condition is composed of a number of individual fragments separated from one another by conjunctions or disjunctions. For example, "result=2*n" is a fragment of VC_timestwo.

These verification conditions are passed to a theorem prover, whereupon the theorem prover will refute VC_main on account of the fragment "x<0" which comes from candidate annotation 2. Such a refutation is presented as a warning 160. At this stage, VC_timestwo is valid.

Because a warning of the second kind is issued and a candidate annotation is mentioned, the warning is mapped into an annotation modification. An illustrative form for a warning message is:

Warning: The call to Timestwo at line 3 of main fails to establish the precondition "n<0."

Then, the refuted candidate annotation 2 is removed from the program (step 514), yielding a first intermediate modified program 124 shown in Table 7:

TABLE 7

First Intermediate Modified Computer Program

```
void main( ) {
    int x = 5;
    int y = timestwo(x);
    //@ assert y >= 0;
}
//@ requires n >= 0;        // candidate annotation 1
//@ ensures \result >= 0;   // candidate annotation 3
//@ ensures \result < 0;    // candidate annotation 4
int timestwo(int n) {
    return 2*n;
}
```

Now, the two verification conditions are generated for the first intermediate modified program by applying the program checking tool to it (step 506) again:

VC_main is now given by:

$x=5 \rightarrow x \geq 0 \wedge (y \geq 0 \wedge y<0 \rightarrow y \geq 0)$.

VC_timestwo is now given by:

$n \geq 0 \wedge result = 2*n \rightarrow result \geq 0 \wedge result<0$.

These verification conditions are passed to the theorem prover. This time, VC_main is valid but VC_timestwo is not on account of the fragment "result<0" which comes from candidate annotation 4. Thus a warning is issued and is mapped into an annotation modification (step 512).

Consequently, the refuted candidate annotation 4 is removed from the program (step 514), yielding a second intermediate modified computer program shown in Table 8:

TABLE 8

Second Intermediate Modified Computer Program

```
void main( ) {
    int x = 5;
    int y = timestwo(x);
    //@ assert y >= 0;
}
//@ requires n >= 0;        // candidate annotation 1
//@ ensures \result >= 0;   // candidate annotation 3
int timestwo(int n) {
    return 2*n;
}
```

The verification conditions are generated for the second intermediate modified computer program (step 506):

VC_main is now given by:

$x=5 \rightarrow x \geq 0 \wedge (y \geq 0 \rightarrow y \geq 0)$.

VC_timestwo is now given by:

$n \geq 0 \wedge (result=2*n \rightarrow result \geq 0)$.

These two verification conditions are passed to the theorem prover, which finds both of them to be valid and issues no new warnings that mention candidate annotations. Hence, finally, the annotation inference system outputs a modified computer program 120 that contains just candidate annotations 1 and 3.

Example 3

Representative Operative Embodiments

The present invention has been implemented within the ESC (extended static checker) project at Compaq Systems Research Center (SRC) (see Detlefs, D. L., et al., SRC Research Report 159, (1998), Compaq Systems Research Center, incorporated herein by reference). The ESC is used to analyze multi-threaded multi-module object-oriented programs. The ESC works for Modula-3programs (see Detlefs, D., "The ESC/Modula-3Specification Language," available at www.research.compaq.com/SRC/esc/escm3/speclang.html), but can be applied more generally for any language in which address arithmetic is restricted, including Java (Sun Microsystems), Ada, Oberon, and FORTRAN.

The present invention has been implemented for the language Java (see, for example, Leino, K. R. M., et al., "ESC/Java User's Manual," SRC Technical Note 2000-002, Compaq Computer Corporation Systems Research Center, (October 2000), also available at gatekeeper.dec.com/pub/DEC/SRC/technical-notes/SRC-2000-002.html).

The ESC performs modular checking: it can be used to check selected modules of a program without checking the entire program (see, for example, Flanagan, et al., "Annotation Inference for Modular Checkers," *Information Processing Letters,* 77:97–108 (2001), incorporated herein by reference). Modular checking facilitates use of the ESC with programs that rely on libraries. The ESC also permits checking for selected classes of errors: for example it is possible to check for deadlocks and race conditions without checking for array index bounds errors. The ESC is used much in the same way as a type checker or like the C tool lint so that its warnings are of greatest meaning to the author of the program being checked.

The present invention has also been implemented at SRC in the Houdini system (see, Flanagan, C., and Leino, K. R. M., "Houdini, an Annotation Assistant for ESC/Java," SRC Technical Note 2000-003), also using ESC/Java as the underlying program checking tool.

Alternate Embodiments

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of annotating a computer program, comprising:
    a) applying a program checking tool to the computer program to produce one or more warnings;

b) mapping at least one of said warnings into at least one annotation modification;

c) modifying the computer program in accordance with said at least one annotation modification so that the number of annotations in the computer program changes, thereby producing a modified computer program;

d) repeating each of steps a), b) and c) until no warnings produced in step a) are suitable for mapping into an annotation modification; and e) providing a user with the modified computer program in which is found at least one annotation.

2. The method of claim 1 wherein at least a subset of said warnings are warnings about potential misapplications of primitive operations in the computer program.

3. The method of claim 2 wherein, prior to said mapping, said warnings about potential misapplications of primitive operations in the computer program are identified, and said modifying comprises inserting into the computer program at least one annotation that is produced by mapping at least one of said warnings about potential misapplications of primitive operations into an annotation modification.

4. The method of claim 1 wherein, prior to said applying, a candidate set of heuristically derived annotations is inserted into the computer program.

5. The method of claim 4 wherein at least a subset of said warnings are warnings about inconsistencies between the computer program and one or more of the annotations.

6. The method of claim 5 wherein said warnings about inconsistencies between the computer program and one or more of the annotations are identified, and said modifying comprises removing from the computer program one of said heuristically derived annotations identified by said at least one annotation modification.

7. The method of claim 4 wherein said set of candidate annotations comprises a candidate invariant for a variable f.

8. The method of claim 4 wherein said set of candidate annotations comprises at least one candidate precondition for a procedure in said computer program.

9. The method of claim 4 wherein said set of candidate annotations comprises at least one candidate postcondition for a procedure in said computer program.

10. The method of claim 7 wherein said candidate invariant is of the form f!=null.

11. The method of claim 7 wherein said candidate invariant comprises an expression that includes a comparison operator.

12. The method of claim 11 wherein said comparison operator is selected from the group consisting of: <, <=, =, !=, >= and >.

13. The method of claim 11 wherein said expression includes an operand selected from the group consisting of: a variable declared earlier in a same class of the computer program; any one of the constants −1, 0, 1; and a constant dimension in an array allocation expression in the computer program.

14. The method of claim 1 wherein at least one of said warnings includes an explanation.

15. The method of claim 1 wherein at least one of said annotations in said modified computer program includes an explanation.

16. The method of claim 6 wherein said removing comprises commenting out one of said heuristically derived annotations from the computer program.

17. The method of claim 16 wherein said removing additionally comprises adding an explanatory comment into one of said heuristically derived annotations from the computer program.

18. The method of claim 3 wherein said annotation includes an explanatory comment.

19. The method of claim 1 wherein said program checking tool is a type checker.

20. The method of claim 1 wherein said program checking tool is an extended static checker.

21. The method of claim 1 wherein said program checking tool comprises a verification condition generator and a theorem prover.

22. A computer program product for use in conjunction with a computer system, the computer program product comprising a computer readable storage medium and a computer program mechanism embedded therein, the computer program mechanism comprising:

a program checking tool for analyzing a computer program to produce one or more warnings;

at least one warning mapper for mapping at least one of said warnings into at least one annotation modification;

a program updater for updating the computer program in accordance with the annotation modification so that the number of annotations in the computer program changes; and control instructions for repeatedly invoking the program checking tool, warning mapper and program updater until no warnings produced by the program checking tool are suitable for mapping into an annotation modification.

23. The computer program product of claim 22 wherein at least a subset of said warnings are warnings about potential misapplications of primitive operations.

24. The computer program product of claim 23, wherein said at least one warning mapper includes instructions for identifying said warnings about potential misapplications of primitive operations, and the program updater includes instructions for inserting into the computer program an annotation that the warning mapper produces by mapping at least one of said warnings about potential misapplications of primitive operations into an annotation modification.

25. The computer program product of claim 22, further including a heuristic annotation generator for generating and inserting a candidate set of heuristically derived annotations into the computer program.

26. The computer program product of claim 25 wherein at least a subset of said warnings are warnings about inconsistencies between the computer program and one or more of the annotations.

27. The computer program product of claim 25 wherein the warning mapper includes instructions for identifying said warnings about inconsistencies between the computer program and one or more of the annotations, and the program updater includes instructions for removing from the computer program one of said heuristically derived annotations identified by said annotation modification.

28. The computer program product of claim 25 wherein said candidate set of annotations comprises a candidate invariant for a variable f.

29. The computer program product of claim 28 wherein said candidate invariant comprises an expression that includes a comparison operator.

30. The computer program product of claim 29 wherein said comparison operator is selected from the group consisting of: <, <=, =, !=, >= and >.

31. The computer program product of claim 29 wherein said expression includes an operand selected from the group consisting of: an earlier declared variable in a same class of the computer program; any one of the constants −1, 0, 1; and a constant dimension in an array allocation expression in the computer program.

32. The computer program product of claim 27 wherein said instructions for removing comprise instructions for commenting out one of said heuristically derived annotations from the computer program.

33. The computer program product of claim 22 wherein said program checking tool is a type checker.

34. The computer program product of claim 22 wherein said program checking tool is an extended static checker.

35. The computer program product of claim 22 wherein said program checking tool comprises a verification condition generator and a theorem prover.

36. A system for annotating a computer program with at least one annotation, the system comprising:
   at least one memory, at least one processor and at least one user interface, all of which are connected to one another by at least one bus;
   wherein said at least one processor is configured to:
   annotate the computer program with at least one annotation;
   apply a program checking tool to the computer program to produce one or more warnings;
   map at least one of said warnings into at least one annotation modification;
   modify the computer program in accordance with the annotation modification so that the number of annotations in the computer program changes; and
   repeat applying the program checking tool, mapping said warnings and modifying the program until no warnings produced by the program checking tool are suitable for mapping into an annotation modification.

37. The system of claim 36 wherein at least a subset of said warnings are warnings about potential misapplications of primitive operations.

38. The system of claim 37, wherein said at least one processor identifies said warnings about potential misapplications of primitive operations, and inserts into the computer program an annotation that a warning mapper produces by mapping at least one of said warnings about potential misapplications of primitive operations into an annotation modification.

39. The system of claim 36, wherein said at least one processor further causes a heuristic annotation generator to generate a candidate set of heuristically derived annotations.

40. The system of claim 38 wherein at least a subset of said warnings are warnings about inconsistencies between the computer program and one or more of the annotations.

41. The system of claim 39 wherein the at least one processor removes from the computer program one of said heuristically derived annotations identified by said annotation modification.

42. The system of claim 39 wherein said candidate set of annotations comprises a candidate invariant for a variable f.

43. The system of claim 42 wherein said candidate invariant comprises an expression that includes a comparison operator.

44. The system of claim 43 wherein said comparison operator is selected from the group consisting of: <, <=, =, !=, >= and >.

45. The system of claim 43 wherein said expression includes an operand selected from the group consisting of: an earlier declared variable in a same class of the computer program; any one of the constants −1, 0, 1; and a constant dimension in an array allocation expression in the computer program.

46. The system of claim 41 wherein the at least one processor comments out one of said heuristically derived annotations from the computer program.

47. The system of claim 36 wherein said program checking tool is a type checker.

48. The system of claim 36 wherein said program checking tool is an extended static checker.

49. The system of claim 36 wherein said program checking tool comprises a verification condition generator and a theorem prover.

50. A method of annotating a computer program, comprising:
   a) applying a program checking tool to the computer program to produce one or more warnings about potential misapplications of primitive operations in the computer program;
   b) mapping at least one of said warnings into at least one annotation modification;
   c) inserting into the computer program said at least one annotation modification, thereby producing a modified computer program;
   d) repeating each of a), b) and c) until no new warnings are produced in a) that are suitable for mapping into an annotation modification; and
   e) providing a user with the modified computer program in which is found at least one annotation.

51. A method of annotating a computer program, comprising:
   a) inserting a candidate set of annotations into the computer program by employing a heuristic analysis of the computer program;
   b) applying a program checking tool to the computer program to produce one or more warnings about inconsistencies between the computer program and one or more of the annotations;
   c) mapping at least one of said warnings into at least one annotation modifications;
   d) removing from the computer program an annotation, from said set of candidate annotations, that is mentioned by at least one of said warnings, thereby producing a modified computer program;
   e) repeating each of b), c) and d) until no new warnings are produced in b) that are suitable for mapping into an annotation modification; and
   f) providing a user with the modified computer program in which is found at least one annotation.

* * * * *

UNITED STATES PATENT AND TRADEMARK OFFICE
CERTIFICATE OF CORRECTION

PATENT NO. : 7,120,902 B2
APPLICATION NO. : 10/005923
DATED : October 10, 2006
INVENTOR(S) : Flanagan et al.

It is certified that error appears in the above-identified patent and that said Letters Patent is hereby corrected as shown below:

In column 21, line 47, delete " $f \in F \wedge C.F.A \rightarrow C.f.A$ " and insert -- $f \in F \wedge C.F.A = A \rightsquigarrow C.f.A = A$ --, therefor.

Signed and Sealed this

Twenty-second Day of December, 2009

David J. Kappos
*Director of the United States Patent and Trademark Office*